(12) United States Patent
Geng et al.

(10) Patent No.: US 12,104,696 B2
(45) Date of Patent: Oct. 1, 2024

(54) CLICK PAD DEVICE

(71) Applicant: SUNREX TECHNOLOGY CORP., Taichung (TW)

(72) Inventors: Yu-Xiang Geng, Taichung (TW); Chun-Chieh Chen, Taichung (TW); Ling-Cheng Tseng, Taichung (TW); Yi-Wen Tsai, Taichung (TW); Ching-Yao Huang, Taichung (TW)

(73) Assignee: Sunrex Technology Corp., Taichung (TW)

( * ) Notice: Subject to any disclaimer, the term of this patent is extended or adjusted under 35 U.S.C. 154(b) by 162 days.

(21) Appl. No.: 18/093,001

(22) Filed: Jan. 4, 2023

(65) Prior Publication Data

US 2024/0133467 A1 Apr. 25, 2024
US 2024/0229934 A9 Jul. 11, 2024

(30) Foreign Application Priority Data

Oct. 19, 2022 (TW) .................................. 111139700

(51) Int. Cl.
*G06F 3/041* (2006.01)
*F16J 15/08* (2006.01)

(52) U.S. Cl.
CPC ........ *F16J 15/0818* (2013.01); *G06F 3/0416* (2013.01)

(58) Field of Classification Search
CPC ..... F16J 15/0818; G06F 3/0416; G06F 3/041; G06F 3/03547
See application file for complete search history.

(56) References Cited

U.S. PATENT DOCUMENTS

| | | | |
|---|---|---|---|
| 2021/0225604 A1* | 7/2021 | Lee | H01H 13/785 |
| 2022/0122788 A1* | 4/2022 | Lai | H01H 13/83 |
| 2023/0245843 A1* | 8/2023 | Lai | H01H 13/83 |
| | | | 200/313 |

FOREIGN PATENT DOCUMENTS

| | | | | |
|---|---|---|---|---|
| CN | 108255358 | | 7/2018 | |
| CN | 113223885 A | * | 8/2021 | ........... H01H 13/705 |
| CN | 116931745 A | * | 10/2023 | |

* cited by examiner

*Primary Examiner* — Ricardo Osorio
(74) *Attorney, Agent, or Firm* — Burris Law, PLLC

(57) ABSTRACT

A waterproof click pad device includes a click pad, a frame and a waterproof unit. The frame surrounds the click pad and surrounds an axis passing through the click pad. The waterproof unit is transverse to the axis and is in sheet form. The waterproof unit includes a frame adhesive member surrounding the axis and adhered to the frame, a first non-adhesive member surrounding the axis, connected to an inner periphery of the frame adhesive member and spaced apart from and located above the frame, a second non-adhesive member surrounding the axis, connected to an inner periphery of the first non-adhesive member and spaced apart from and located above the click pad and the frame, and an plate adhesive member connected to an inner periphery of the second non-adhesive member and adhered to the click pad.

7 Claims, 6 Drawing Sheets

CLICK PAD DEVICE

CROSS-REFERENCE TO RELATED APPLICATION

This application claims priority to Taiwanese Invention Patent Application No. 111139700, filed on Oct. 19, 2022.

FIELD

The present disclosure relates to a click pad device, more particularly to a waterproof click pad device.

BACKGROUND

An existing click pad device disclosed in CN108255358A includes a substrate, a click pad movably mounted to the substrate, and a waterproof film adhered to the click pad and the substrate and having a uniform thickness. The waterproof film covers the click pad and a portion of the substrate, is made of a PVC material, and has resilient deformability. The waterproof film of the click pad device can provide waterproof effect. However, since the waterproof film is of uniform thickness and is adhered to the click pad and the substrate, after repeated clicking and pressing, a portion of the waterproof film located at the junction of the substrate and the click pad may be easily damaged due to being continuously stretched and compressed.

SUMMARY

Therefore, an object of the disclosure is to provide a waterproof click pad device that can alleviate the drawback of the prior art.

According to the disclosure, the waterproof click pad device includes a click pad, a frame and a waterproof unit. The frame surrounds the click pad and surrounds an axis passing through the click pad. The waterproof unit is transverse to the axis and is in sheet form. The waterproof unit includes a frame adhesive member that surrounds the axis and that is adhered to the frame, a first non-adhesive member that surrounds the axis, that is connected to an inner periphery of the frame adhesive member and that is spaced apart from and located above the frame, a second non-adhesive member that surrounds the axis, that is connected to an inner periphery of the first non-adhesive member and that is spaced apart and located above the click pad and the frame, and an plate adhesive member that is connected to an inner periphery of the second non-adhesive member and that is adhered to the click pad.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 5 is a fragmentary sectional view taken along line V-V in

FIG. 3.

DETAILED DESCRIPTION

Figure 1:
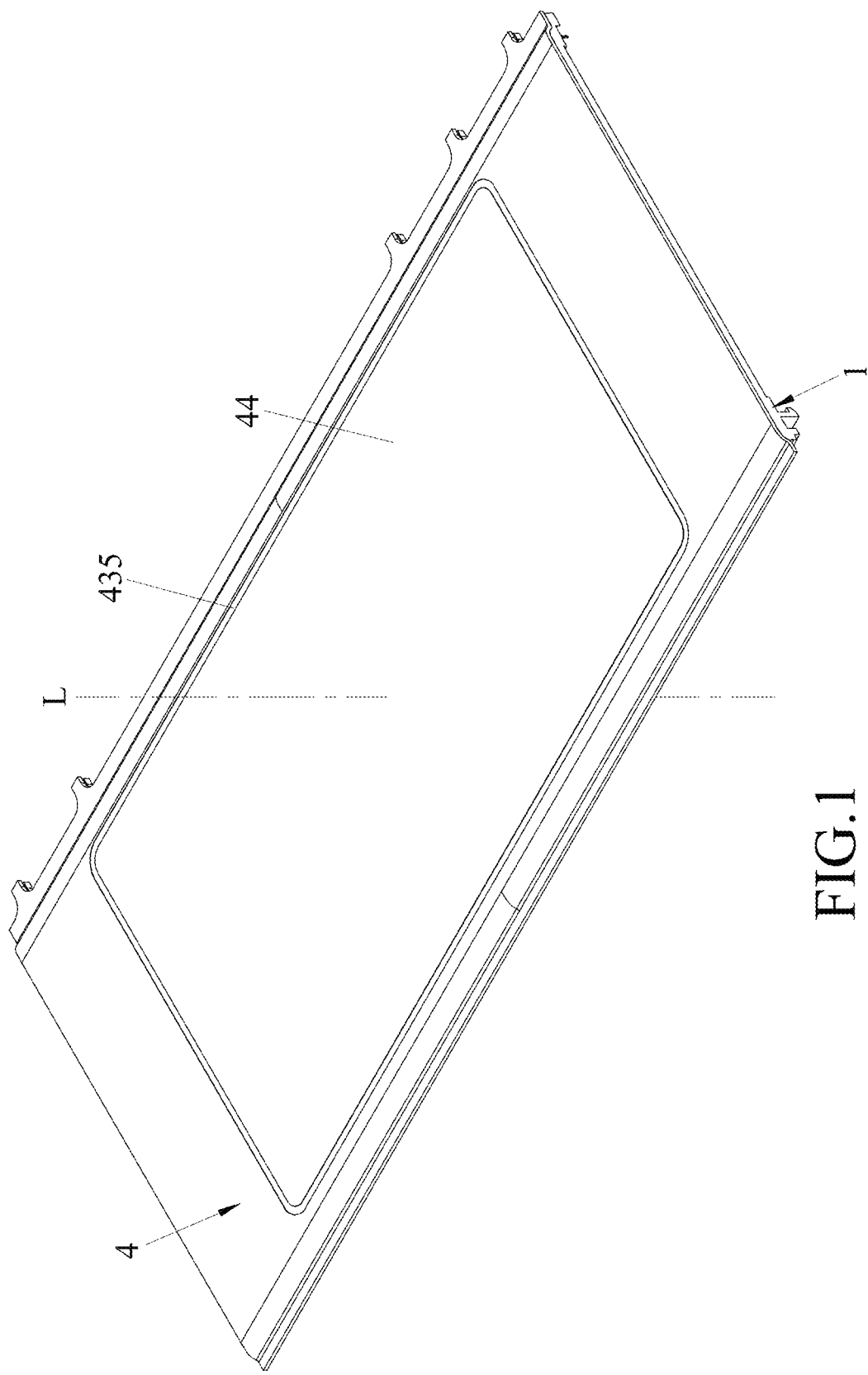
FIG. 1 is an assembled perspective view of an embodiment of a waterproof click pad device according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
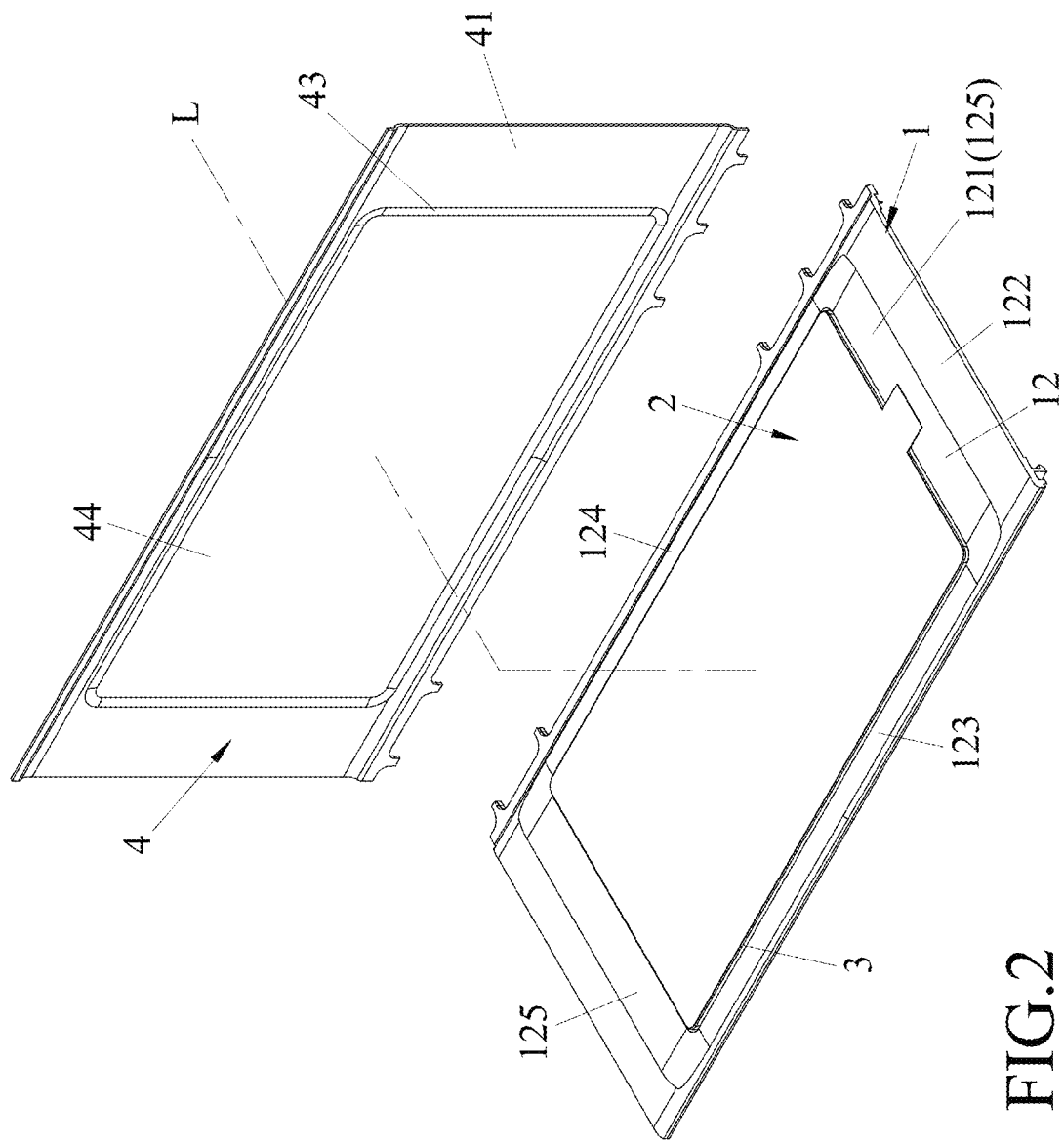
FIG. 2 is a partly exploded perspective view of the embodiment.

Referring to FIGS. 1 and 2, an embodiment of a waterproof click pad device of the present disclosure includes a base unit 1, a click pad 2, and a waterproof unit 4.

Figure 3:
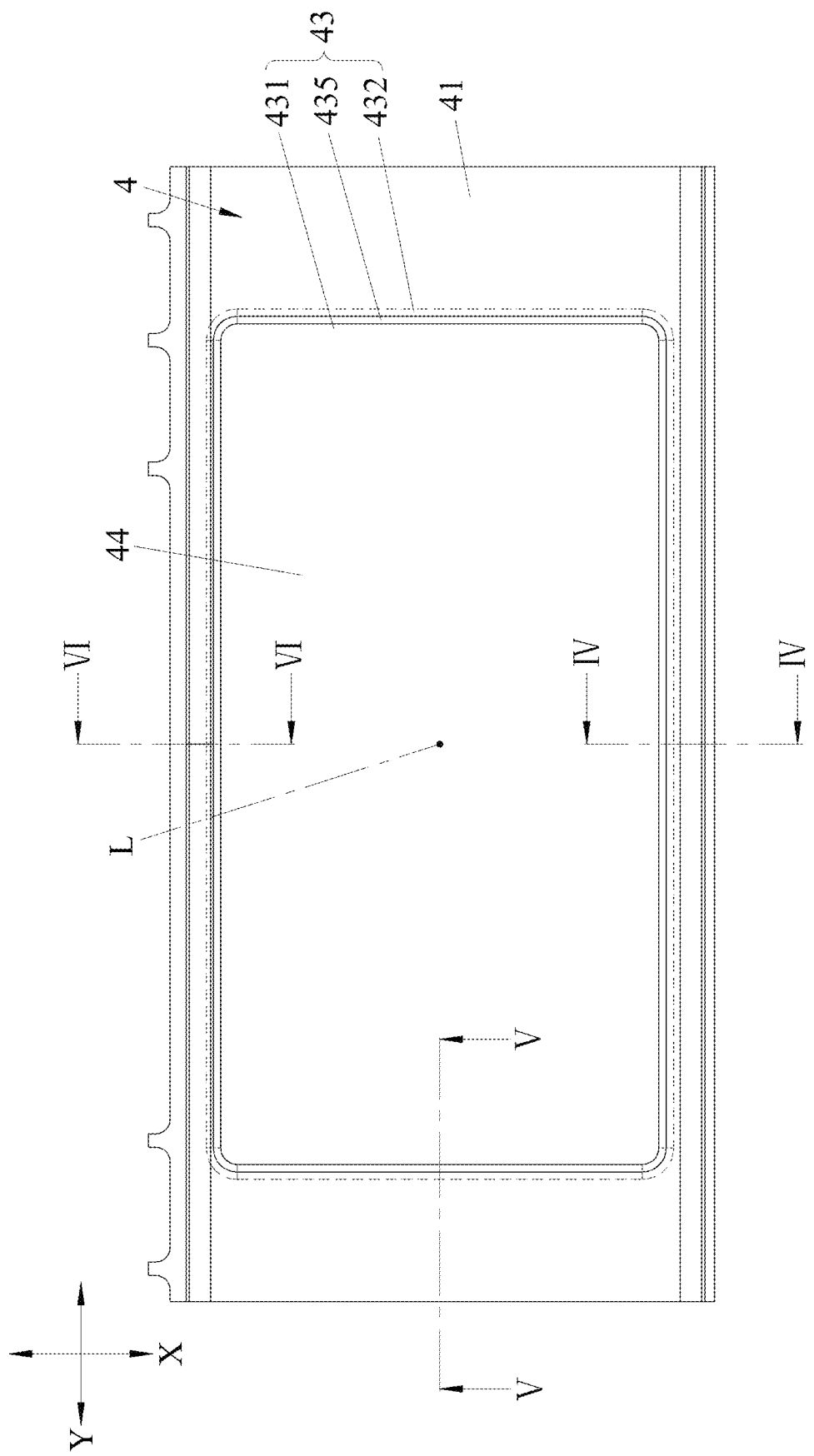
FIG. 3 is a top view of the embodiment.
Figure 4:
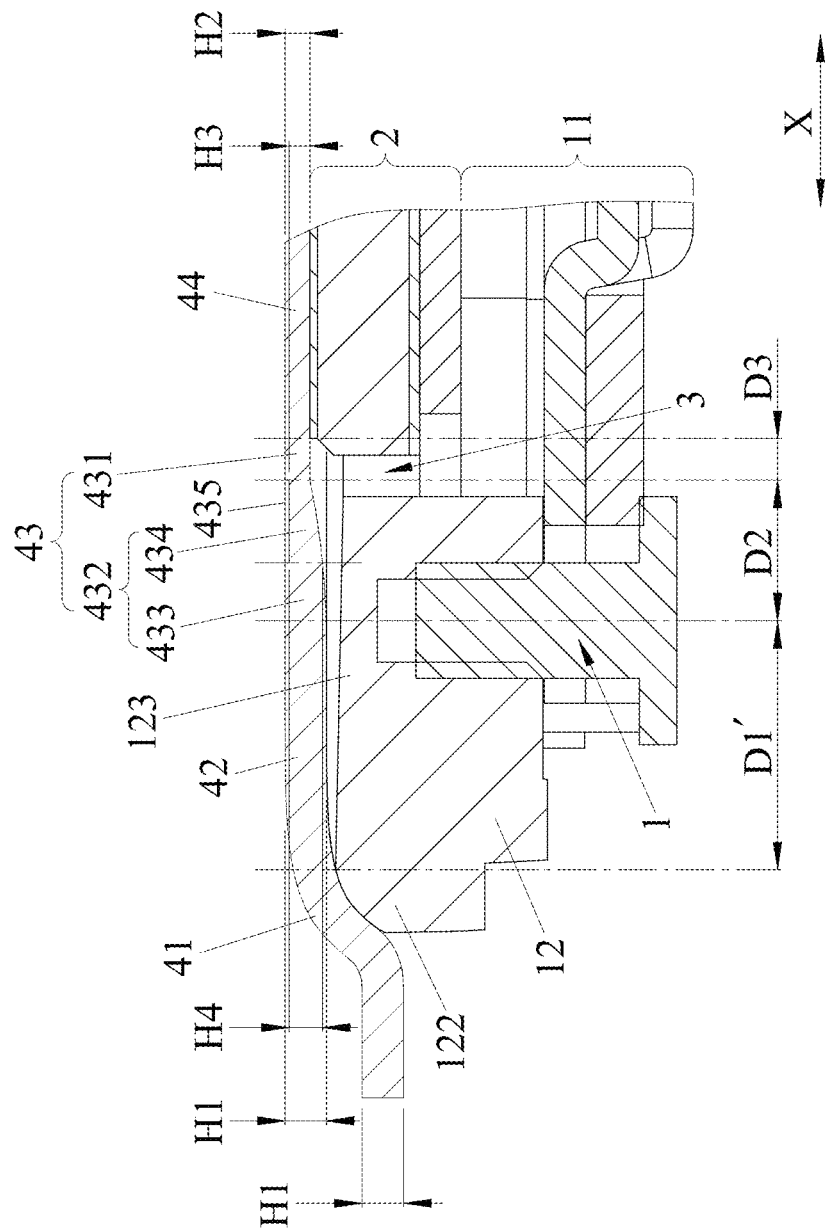
FIG. 4 is a fragmentary sectional view taken along line IV-IV in FIG. 3.

Referring to FIGS. 2 to 4, the base unit 1 includes a base 11, and a frame 12 disposed on the base unit 1 and surrounding an axis (L) that extends in a first axial direction (Z).

The click pad 2 is disposed on the base 11.

The frame 12 is disposed on the base 11 and surrounds the click pad 2. The frame 12 includes a non-adhesive portion 121 surrounding the click pad 2 and cooperating with the click pad 2 to define a gap 3, and an adhesive portion 122 surrounding and connected to an outer periphery of the non-adhesive portion 121. The gap 3 is located between the frame 12 and the click pad 2.

A surface of the non-adhesive portion 121 opposite to the base 11 inclines toward the base 11 in a direction from the adhesive portion 122 toward the click pad 2. The non-adhesive portion 121 includes a first non-adhesive segment 123 extending along a second axial direction (Y) perpendicular to the first axial direction (Z), a second non-adhesive segment 124 extending along the second axial direction (Y) and spaced apart from the first non-adhesive segment 123 in a third axial direction (X) perpendicular to the first axial direction (Z) and the second axial direction (Y), and two third non-adhesive segments 125 spaced apart from each other in the second axial direction (Y). Each of the third non-adhesive segments 125 extends along the third axial direction (X) and is connected between the first non-adhesive segment 123 and the second non-adhesive segment 124.

The waterproof unit 4 is transverse to the axis (L) and is in the form of a sheet. The waterproof unit 4 includes a frame adhesive member 41 surrounding the axis (L) and adhered to the adhesive portion 122 of the frame 12, a first non-adhesive member 42 surrounding the axis (L), connected to an inner periphery of the frame adhesive member 41, and located above and spaced apart from the non-adhesive portion 121 of the frame 12, a second non-adhesive member 43 surrounding the axis (L), connected to an inner periphery of the first non-adhesive member 42, and located above and spaced apart from the non-adhesive portion 121, the click pad 2 and the gap 3, and a plate adhesive member 44 connected to an inner periphery of the second non-adhesive member 43 and adhered to the click pad 2.

The second non-adhesive member 43 has a connecting portion 431 connected to the plate adhesive member 44, and a buffer portion 432 extending taperingly from the first non-adhesive member 42 to the connecting portion 431. The buffer portion 432 has a uniform width (D2) transverse to the axis (L). The connecting portion 431 has a uniform width (D3) transverse to the axis (L).

The buffer portion 432 has a first segment 433 connected to the first non-adhesive member 42, and a second segment 434 connected between the first segment 433 and the connecting portion 431. The second segment 434, the first segment 433 and the connecting portion 431 cooperatively define an annular groove 435 surrounding the connecting portion 431. In this embodiment, the annular groove 435 is located at one side of the second segment 434 opposite to the frame 12. In a modification of the embodiment, the annular groove 435 may also be located at one side of the second segment 434 facing the frame 12, but is not limited thereto.

Through the design that the surface of the non-adhesive portion 121 opposite to the base 11 inclines toward the base 11 in a direction from the adhesive portion 122 toward the click pad 2, in the case that the thickness (H1) of the frame adhesive member 41 is equal to the thickness (H1) of the first non-adhesive member 42, the first non-adhesive member 42 can be located above and spaced apart from the non-adhesive portion 121. The thickness (H2) of the connecting portion 431 is equal to the thickness (H2) of the plate adhesive member 44 and is greater than the thickness (H3) of a portion of the second segment 434 of the buffer portion 432 adjacent to the connecting portion 431. The thickness (H1) of the first non-adhesive member 42 is greater than the thickness (H2) of the connecting portion 431 and is greater than the thickness (H4) of a portion of the second segment 434 adjacent to the first segment 433. The thickness (H4) of the portion of the second segment 434 adjacent to the first segment 433 is greater than the thickness (H3) of the portion of the second segment 434 adjacent to the connecting portion 431.

In this embodiment, the thickness (H1) of the first non-adhesive member 42 is 0.5 millimeters (mm), the thickness (H3) of the portion of the second segment 434 adjacent to the connecting portion 431 is 0.25 mm, and the thickness (H4) of the portion of the second segment 434 adjacent to the first segment 433 is 0.3 mm. That is, the thickness of the second segment 434 ranges between 0.25 and 0.3 mm, but is not limited thereto.

Figure 5:
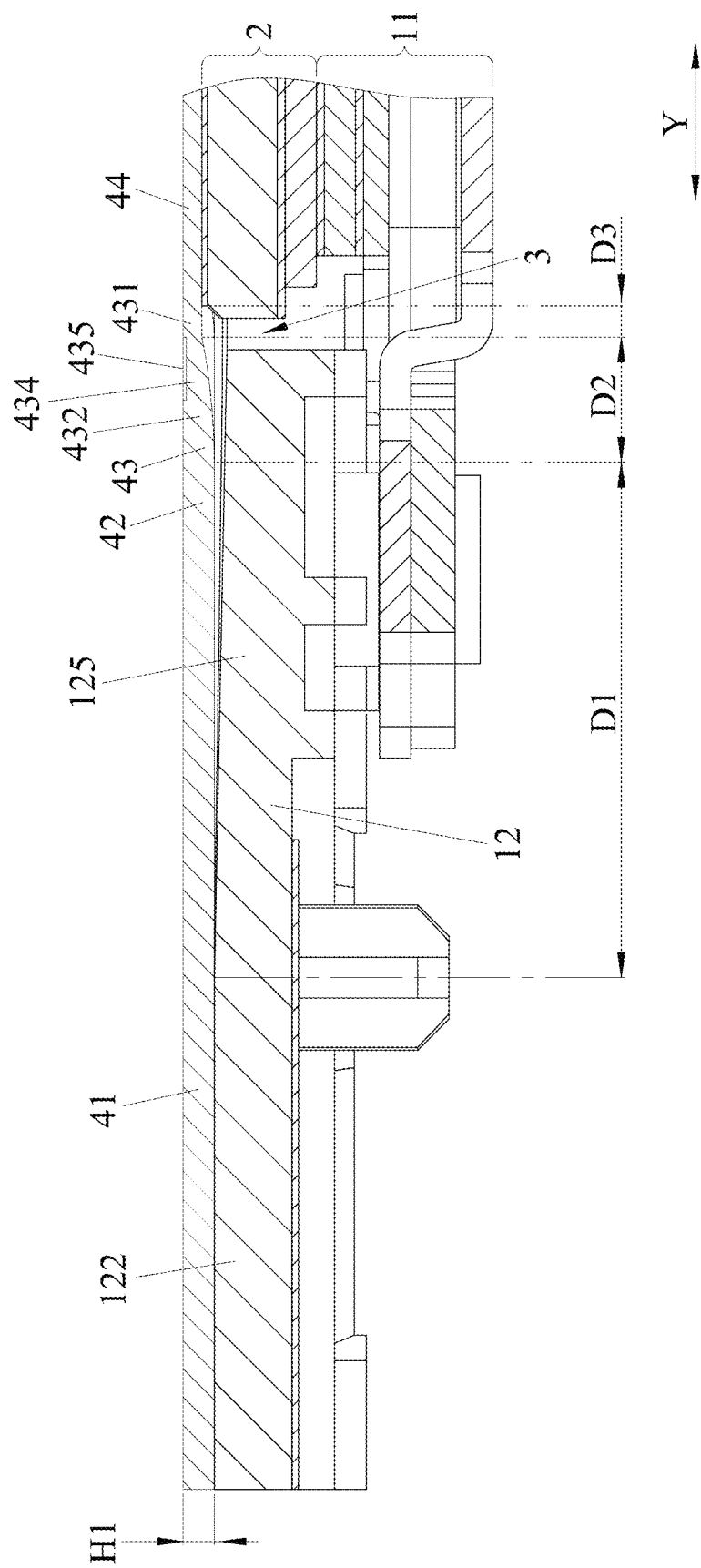

Referring to FIGS. 4 and 5, a width (D1) in the second axial direction (Y) of a portion of each of the third non-adhesive segments 125 located under the first non-adhesive member 42 is greater than a width (D1') in the third axial direction (X) of a portion of the first non-adhesive segment 123 located under the first non-adhesive member 42.

Figure 6:
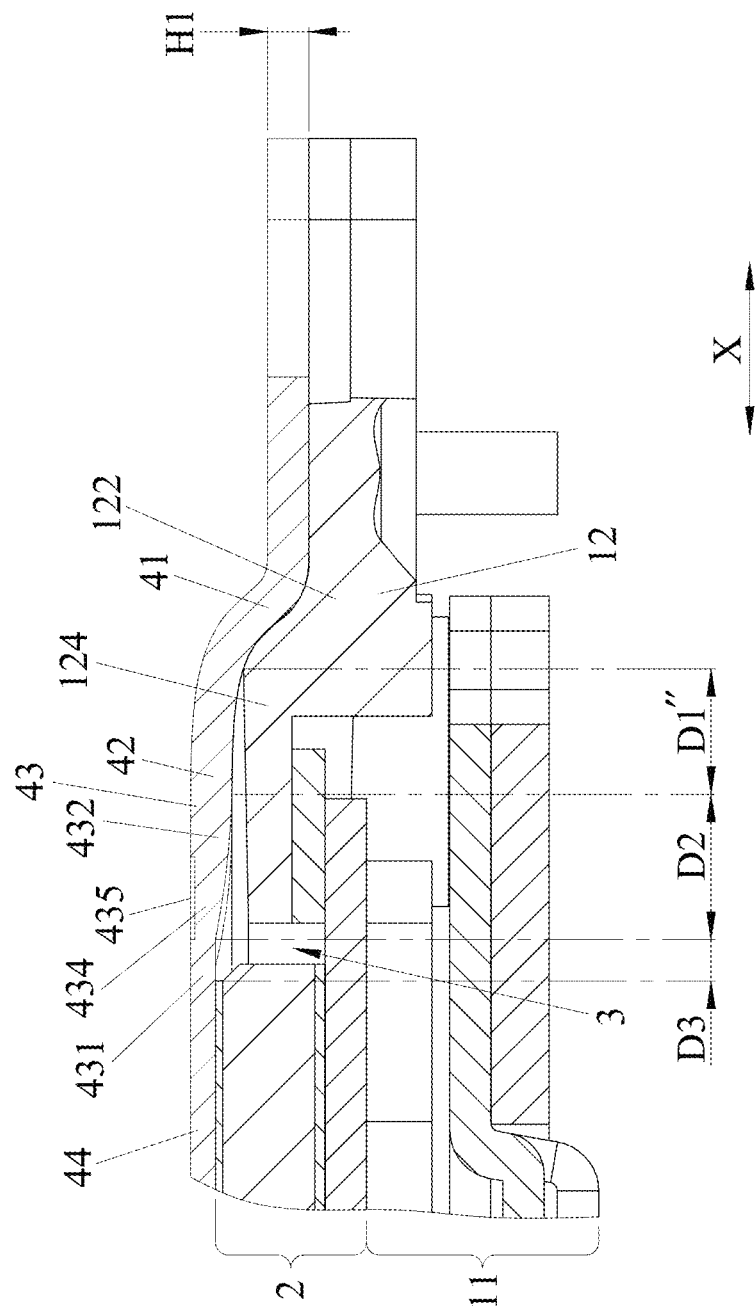
FIG. 6 is a fragmentary sectional view taken along line VI-VI in FIG. 3.

Referring to FIGS. 4 and 6, the width (D1') in the third axial direction (X) of the portion of the first non-adhesive segment 123 located under the first non-adhesive member 42 is greater than a width (D1") in the third axial direction (X) of a portion of the second non-adhesive segment 124 located under the first non-adhesive member 42.

Referring to FIGS. 4 to 6, the width (D2) of the buffer portion 432 in the third axial direction (X) is greater than the width (D3) of the connecting portion (431) along the third axial direction (X). The width (D2) of the buffer portion 432 in the second axial direction (Y) is greater than the width (D3) of the connecting portion 431 in the second axial direction (Y). The width (D1) in the second axial direction (Y) of the portion of each of the third non-adhesive segments 125 located under the first non-adhesive member 42 is greater than the width (D2) of the buffer portion 432 in the second axial direction (Y).

In this embodiment, the width (D1) in the second axial direction (Y) of the portion of each of the third non-adhesive segments 125 located under the first non-adhesive member 42 is 28 mm. The width (D1') in the third axial direction (X) of the portion of the first non-adhesive segment 123 located under the first non-adhesive member 42 is 3 mm. The width (D1") in the third axial direction (X) of the portion of the second non-adhesive segment 124 located under the first non-adhesive member 42 is 1.3 mm. The width (D2) of the buffer portion 432 in the second and third axial directions (X, Y) is 2 mm. The width (D3) of the connecting portion 431 in the second and third axial directions (X, Y) is 0.5 mm, but is not limited thereto.

In summary, since the waterproof click pad device of this disclosure has the first and second non-adhesive members 42, 43 that are spaced apart from and located above the click pad 2 and the frame 12, a portion of the waterproof unit 4 around the click pad 2 is not adhered to the base unit 1. When the user presses the plate adhesive member 44 and the click pad 2 to resiliently deform the waterproof unit 4, the upper and lower sides of the first and second non-adhesive members 42, 43 both have space for free extension or contraction, so that breakage of the waterproof unit 4 between the click pad 2 and the frame 12 can be prevented. Simultaneously, since the thickness of the second non-adhesive member 43 is reduced from the first non-adhesive member 42 toward the connecting portion 431, and since the annular groove 435 is formed on one side of the second segment 434 opposite to the frame 12, the first and second non-adhesive members 42, 43 have better flexibility, thereby prolonging the service life of the waterproof unit 4, thus achieving the object of this disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A waterproof click pad device comprising: a click pad; a frame surrounding said click pad and surrounding an axis passing through said click pad; and a waterproof unit transverse to said axis and in sheet form, said waterproof unit including a frame adhesive member that surrounds the axis and that is adhered to said frame, a first non-adhesive member that surrounds the axis, that is connected to an inner periphery of said frame adhesive member and that is spaced apart from and located above said frame, a second non-adhesive member that surrounds the axis, that is connected to an inner periphery of said first non-adhesive member and that is spaced apart from and located above said click pad and said frame, and an plate adhesive member that is connected to an inner periphery of said second non-adhesive member and that is adhered to said click pad, wherein said second non-adhesive member has a buffer portion tapering in thickness, wherein said second non-adhesive member further has a connecting portion connected to said plate adhesive member and said buffer portion and having a thickness smaller than that of said first non-adhesive member, wherein said buffer portion has a first segment connected to said first non-adhesive member, and a second segment connected between said first segment and said connecting portion, said second segment cooperating with said first segment and said connecting portion define an annular groove that surrounds said connecting portion, a thickness of a portion of said second segment adjacent to said first segment is greater than that of another portion of said second segment adjacent to said connecting portion.

2. The waterproof click pad device as claimed in claim 1, wherein said annular groove is located on one side of said second segment opposite to said frame.

3. The waterproof click pad device as claimed in claim 2, wherein said connecting portion has a thickness greater than that of the portion of said second segment adjacent to said connecting portion, the thickness of said first non-adhesive member being greater than the thickness of said connecting portion and being greater than the thickness of the portion of said second segment adjacent to said first segment.

4. The waterproof click pad device as claimed in claim 1, wherein said connecting portion has a thickness equal to the thickness of said plate adhesive member.

5. The waterproof click pad device as claimed in claim 1, wherein the width of said buffer portion in a direction perpendicular to the axis is greater than that of said connecting portion in a direction perpendicular to the axis.

6. The waterproof click pad device as claimed in claim 1, wherein the thickness of said first non-adhesive member is equal to the thickness of said frame adhesive member.

7. The waterproof click pad device as claimed in claim 1, wherein the axis extends along a first axial direction, said frame including a non-adhesive portion that surrounds said click pad, that cooperates with said click pad to define a gap and that is spaced apart from and located below said first non-adhesive member, and an adhesive portion that surrounds and is connected to said non-adhesive portion, and that is adhered to said frame adhesive member, said non-adhesive portion includes a first non-adhesive segment that extends along a second axial direction perpendicular to the first axial direction, a second non-adhesive segment that extends along the second axial direction and that is spaced apart from the first non-adhesive segment in a third axial direction perpendicular to the first axial direction and the second axial direction, and two third non-adhesive segments that are spaced apart from each other in the second axial direction, each of said third non-adhesive segments extending along the third axial direction and being connected between said first non-adhesive segment and said second non-adhesive segment, a width in the second axial direction of a portion of each of the third non-adhesive segments that is located under the first non-adhesive member being greater than a width in the third axial direction of a portion of the first non-adhesive segment that is located under the first non-adhesive member, and being greater than a width in the third axial direction of a portion of the second non-adhesive segment that is located under the first non-adhesive member.

* * * * *